Jan. 26, 1971     E. M. JOST     3,558,356
NICKEL-ZINC BATTERY SYSTEM WHICH IS NEGATIVE
LIMITED DURING CHARGING THEREOF

Filed Feb. 28, 1967     2 Sheets-Sheet 1

INVENTOR
ERNEST M. JOST

ATT'Y.
James P. McAndrews

United States Patent Office

3,558,356
Patented Jan. 26, 1971

3,558,356
NICKEL-ZINC BATTERY SYSTEM WHICH IS NEGATIVE LIMITED DURING CHARGING THEREOF
Ernest M. Jost, Plainville, Mass., assignor to Texas Instruments Incorporated, Dallas, Tex., a corporation of Delaware
Filed Feb. 28, 1967, Ser. No. 619,468
Int. Cl. H01m 35/02
U.S. Cl. 136—6      6 Claims

ABSTRACT OF THE DISCLOSURE

A sealed nickel-zinc battery system is shown in which the charge capacity of the positive nickel electrode somewhat exceeds the charge capacity of the negative zinc electrode for preventing the evolution of oxygen at the positive electrode during charging of the battery system, the battery system being characterized by a sharp change in negative electrode potential and slight evolution of hydrogen at the negative electrode when the negative electrode is fully charged and by supported membrane means for venting hydrogen gas from within the battery system.

BACKGROUND OF THE INVENTION

In prior art sealed, nickel-cadmium battery systems, the positive nickel electrode is provided with somewhat smaller energy capacity than the negative cadmium electrode. This battery system is said to be positive limited on charge and discharge. That is, oxygen is normally evolved at the positive electrode during charging thereof but the battery system is fully charged to the capacity limited by the positive electrode before hydrogen is evolved at the negative electrode. The oxygen evolved at the positive electrode undergoes a chemical reaction with the active material on the negative electrode so that no substantial increase in oxygen pressure occurs within the battery during the charging thereof.

When such a ratio of electrode capacity is provided in a nickel-zinc battery system, however, the heat evolved in the chemical reaction occurring between oxygen in the system and the excess active material at the negative electrode stimulates the rate of evolution of oxygen of the positive electrode. As a result, such a nickel-zinc battery system rapidly increases in temperature during charging of the battery, this temperature increase ultimately causing destruction of the battery system.

SUMMARY OF THE INVENTION

It is an object of this invention to provide a novel and improved nickel-zinc battery system which is not overheated during charging thereof; to provide such a battery system which does not develop excessive internal pressures during use; and to provide such a battery system which furnishes a conveniently recognizable signal indicating when charging the battery should be terminated. In accordance with this invention, a sealed nickel-zinc battery system incorporates a positive nickel electrode having a charge capacity which somewhat exceeds the charge capacity of the negative zinc electrode. When such a system is charged, the negative electrode is charged to substantially its full capacity before hydrogen is evolved at the negative electrode. Further, the evolution of hydrogen occurring as the electrode reaches full charge is accompanied by a sharp change in the negative electrode potential providing a signal indicating that charging of the battery system should be discontinued. On the other hand, the positive electrode is only partly charged at the time when the negative electrode is fully charged. Therefore, when charging of the system is discontinued in response to the signal developed at the negative electrode after full charging thereof, no oxygen is evolved at the positive electrode in the battery system.

In accordance with this invention, the sealed battery system incorporates a supported membrane means adapted to permit transport of hydrogen gas through the membrane means to the ambient atmosphere for venting the battery system to prevent any substantial increase of hydrogen pressure within the system. In this arrangement, wherein charging of the battery system is limited by the energy capacity of the negative electrode, an effective rechargeable battery system is provided.

DESCRIPTION OF PREFERRED EMBODIMENTS

Figure 1:
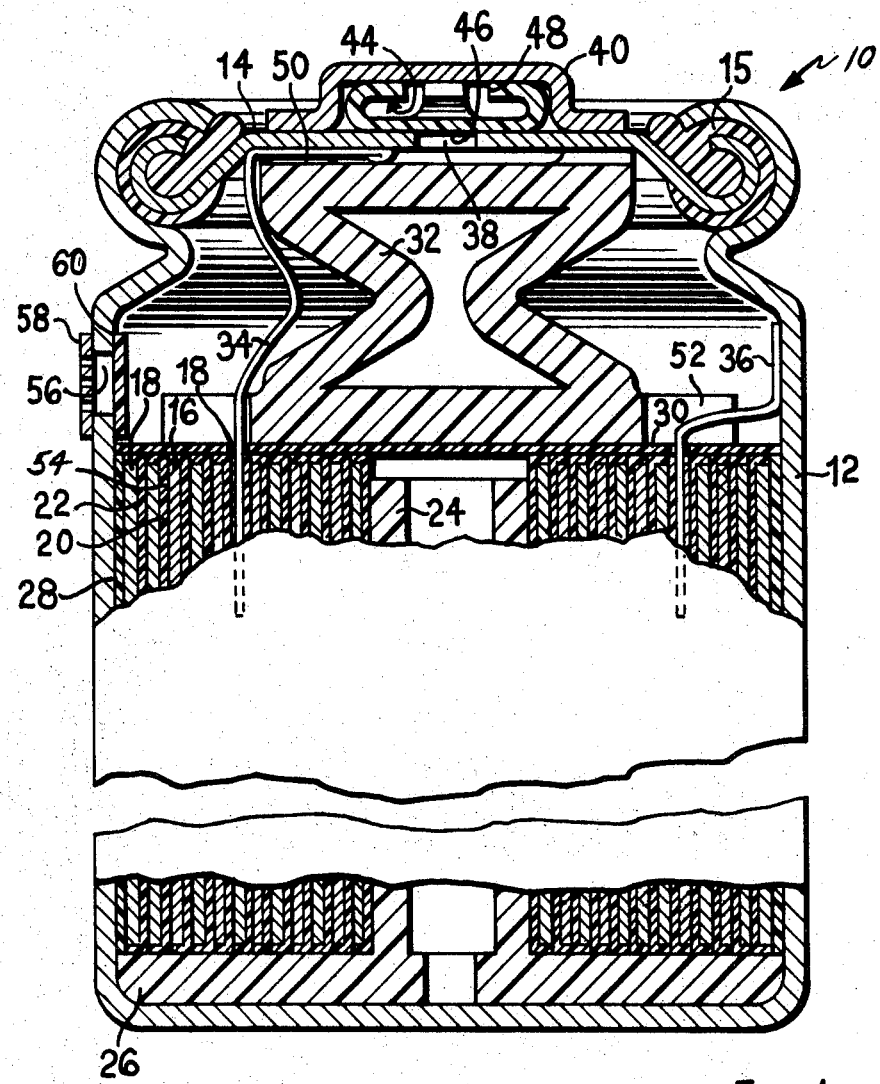
FIG. 1 is a section view along the vertical axis of the battery provided by this invention.
Figure 2:
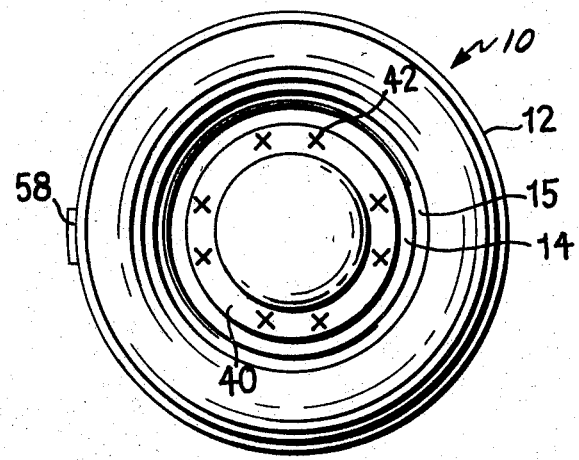
FIG. 2 is a plan view, to relatively smaller scale, of the battery of FIG. 1.

Referring to the drawings, 10 in FIGS. 1 and 2 indicates the novel and improved sealed battery system of this invention which is shown to include a casing 12 of nickel, steel or other suitably strong and rigid material and a casing cover 14, preferably of the same or similar material, the cover being sealed to and electrically insulated from the casing by a fused ring 15 of plastic material such as polyethylene or the like.

Figure 3:
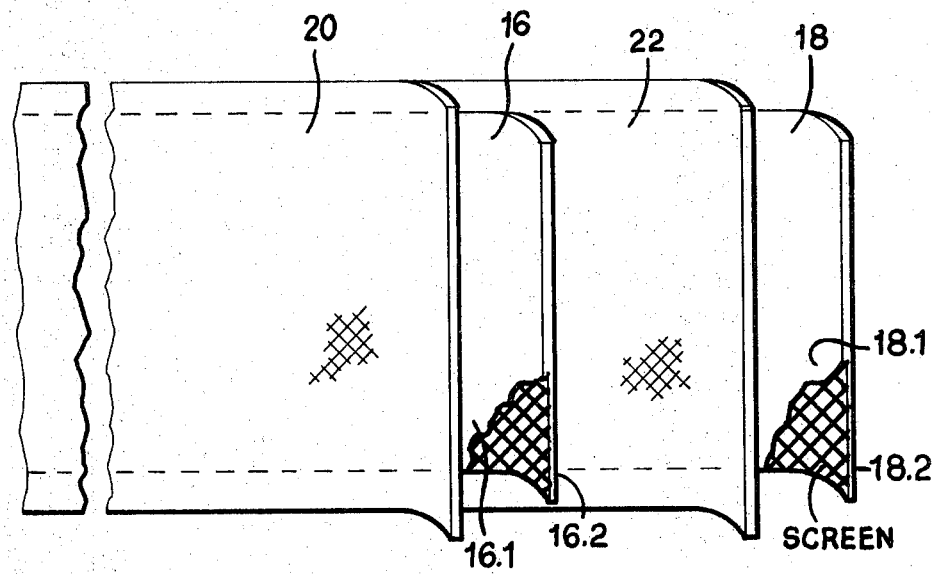
FIG. 3 is a perspective view of the electrode and separator structure of the battery of this invention showing the electrodes and separators prior to assembly within the battery of FIG. 1.

In accordance with this invention, as shown in FIG. 3 the battery 10 incorporates a porous negative electrode 16, preferably comprising a quantity of electrochemically active zinc particles 16.1 secured to an electrically-conductive substrate 16.2 such as zinc-plated, woven mesh nickel screen. The battery further incorporates a porous positive electrode 18, preferably comprising a mixture of electrochemically active nickel hydroxide particles and suitable conductor particles such as nickel metal powder 18.1 secured to an electrically-conductive substrate, 18.2 such as a woven mesh nickel screen. As a preferred construction of such electrodes is described in the copending application titled "Battery Electrode and Method of Making" filed in the name of P. V. Popat and K. Johnson on or about Mar. 1, 1967 which application is now owned by the assignee of the present application, the electrodes 16 and 18 are not further described herein. However, it will be understood that the positive electrode 18 has greater charge capacity than the negative electrode 16, the electrodes proferably having approximately equal energy capacity per unit area but the positive electrode being somewhat longer than the negative electrode as illustrated in FIG. 3 to provide the positive electrode with at least approximately 15% greater charge capacity than the negative electrode. For example, in a practical embodiment of the invention the negative electrode 16 incorporates 2.5 grams of electrochemically active zinc material and has a deliverable energy capacity of 2.00 ampere-hours at a rate of 200 milliamperes per hour. The positive electrode 18 in this practical embodiment incorporates approximately 7.5 grams of electrochemically active β-nickelic hydroxide and has a deliverable energy of 2.20 ampere-hours at a rate of 200 milliamperes per hour. As illustrated in FIG. 3, the electrodes 16 and 18 are interleaved with porous separators 20 and 22 which are preferably formed of a non-woven material such as a polyamide felt.

The electrodes 16 and 18 together with the separators 20 and 22 are wound on a mandrel 24 which has a base or flange 26 adapted to fit snugly within the casing 12. The wound electrodes structure is then inserted into the casing 10 inside a cylindrical insulator sleeve 28. As illustrated, the separators 20 and 22 preferably have a greater width than the electrodes so that the separators are flattened at their edges over the edges of the electrodes as illustrated in FIG. 1. An insulating disc 30 is then preferably placed on top of the electrode structure as shown, the sleeve 28 and disc 30 preferably being formed of the same material as the separators 20 and 22.

A spacer 32 preferably formed for plastic such as polyethylene rests on top of the insulator disc and bears against the cover 14 for holding the electrode structure against axial movement in the casing. An electrically conductive tab or lead 34 of nickel or the like is welded to the positive electrode 18 and is welded or soldered to the cover; and a second electrically-conductive tab or lead 36 of zinc-plated nickel or the like is welded to the negative electrode 16 and is welded or soldered to the casing as illustrated in FIG. 1.

The cover 14 is preferably provided with a central aperture 38 and a terminal cap 40 is welded to the cover at spaced locations 42 around the cover aperture so that the cap is secured to the cover but is not sealed in liquid-tight relation thereto. Within the terminal cap, a spider-like member 44 has a valve portion 46 normally adapted to seat against the rim of the cover aperture 38 for sealing fluids within the casing 12. The member 44 has legs 48 which normally bear against the terminal cap for holding the valve portion 46 in sealing relation to the aperture, the legs 48 being adapted to flex in response to the internal pressure, preferably in the order of 60 pounds per square inch, within the casing 14 for releasing the internal pressure through the cover aperture and under the terminal cap 40, as illustrated, the spacer member 32 inside the casing is preferably provided with gas passages 50 permitting access of gas to the cover aperture 38 and has clearance notches 52 permitting easy connection of the leads 34 and 36 to the electrodes.

The battery system 10 preferably incorporates an alkaline electrolyte such as a 7 M concentration of potassium hydroide in water, sufficient electrolyte being employed to thoroughly wet the electrodes 16 and 18 and to fill some, and preferably substantially all, pores in the seaparators 20 and 22 to form electrolytic paths as indicated at 54 between the electrodes.

In accordance with this invention, the casing 12 has an aperture 56 and has a perforated plate or screen or other rigid foraminous means 58 welded or soldered to the casing over the aperture. In addition, a membrane 60 permeable to hydrogen is cemented to the inner wall of the casing 12 over the aperture 56 with an epoxy resin or the like as shown in FIG. 1. For example, the membrane 60 preferably comprises a film of polyethylene plastic of about 0.002 inch thickness, the perforated plate 58 being stiff and rigid and having perforations preferably no larger than .020 inch in diameter. In this illustration, the membrane 60 is adapted to permit the transport of hydrogen from within the casing 12 to the ambient atmosphere and the membrane is adapted to stretch against the perforated plate 58 in response to increase in hydrogen pressure within the casing, the plate then serving to support the membrane to retain an internal pressure at least as great as the pressure retained in the casing by the spider valve member 44 as will be understood. In this way, the membrane is adapted to vent hydrogen gas from within the casing but does not permit the escape of electrolyte from the casing.

Figure 4:
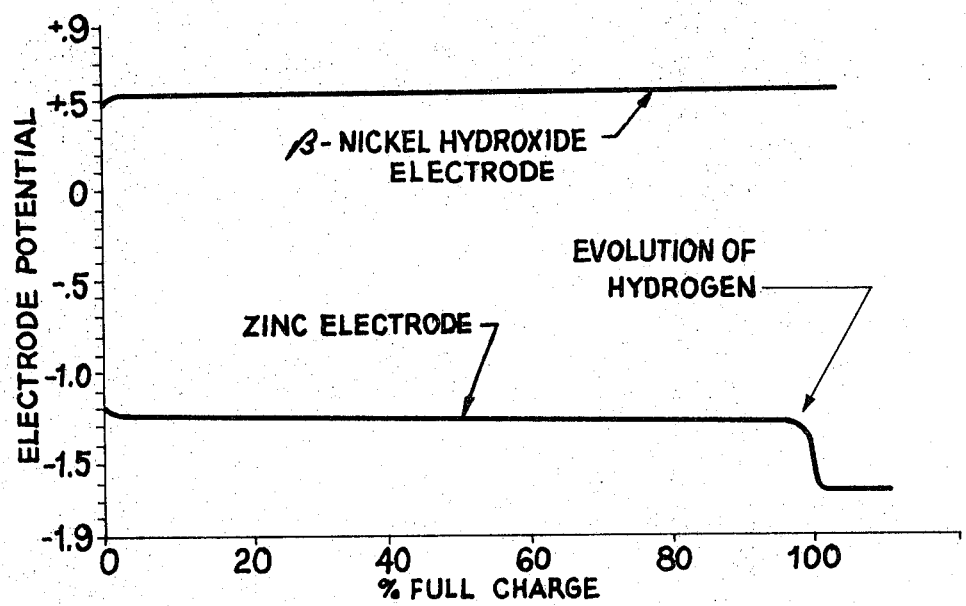
FIG. 4 is a graph illustrating characteristics of the battery of this invention during charging thereof.

In this construction, the battery 10 comprises a negative-limited battery on charging thereof. That is, the casing 12 and the terminal cap 14 comprise the negative and positive terminals of the battery respectively in conventional manner. When such a battery is charged using a conventional constant-current charging source at a rate of 200 milliamperes per hour, for example, the negative electrode advantageously charges to approximately 90% of its fully charged level within about 4½ hours without the evolution of any significant amount of hydrogen gas at the negative electrode. During charging to this level, the potential of the electrode changes only to a slight extent as indicated in the graph of FIG. 4. The negative electrode then begins to evolve hydrogen gas at a significant rate and continues to evolve the hydrogen gas as the electrode becomes fully charged within about 30 minutes. However, the evolution of hydrogen at a significant rate is also advantageously accompanied by a significant change in negative electrode potential as is also indicated in FIG. 4, this sharp change in electrode potential serving as an indication that the electrode is approaching fully charged condition. During this charging of the battery 10, the positive nickel electrode is charged to only a relatively smaller proportion of its capacity with the desirable result that substantially no oxygen is evolved at the positive electrode during the time that the negative electrode is being fully charged. As indicated in FIG. 4, charging of the positive electrode is accompanied by only a gradual change in the positive electrode potential.

The sharp change in negative electrode potential serves as an indication that the battery is approaching its fully charged condition so that charging of the battery is then discontinued. For example, a voltmeter connected to the charging source in conventional manner visually indicates this change in electrode potential and indicates when charging of the battery is to be discontinued. Alternately, by use of an appropriate charging circuit not part of this invention, the change in negative electrode potential occurring as the battery becomes fully charged can be employed for automatically discontinuing charging of the battery 10.

Several alternate means are used within the scope of this invention to assure that the battery comprises a negative-limited battery in charging thereof. If the positive and negative electrodes have approximately equal charge capacity per unit area, the positive electrode is made somewhat longer than the negative electrode as illustrated in FIG. 3. Similar results are obtained using electrodes of similar charge capacity by assembling the cell with a partly charged negative electrode and a fully discharged positive electrode. In such an arrangement, the negative electrode is adapted to be fully charged before the positive electrode is fully charged. This system, of course, is positive limited on discharge in that the positive electrode is adapted to be fully discharged before the negative electrode is fully discharged. In another alternate arrangement, the desired ratio of available charge capacities of the electrodes is achieved by providing the positive electrode with relatively higher charge capacity per unit area than the negative electrode, the electrodes being of approximately equal length. The important point is that the positive electrode has greater capacity available to be charged than the negative electrode.

It is noted that as the battery 10 is brought to fully charged condition some hydrogen gas is evolved at the negative electrode resulting in a small increase in hydrogen pressure within the casing 10. However, this hydrogen gas is continuously vented from the casing through the membrane 60 while the battery awaits use or while the battery is being discharged during use so that, after each charge and discharge cycle, the hydrogen pressure within the casing 12 remains substantially the same. That is, where the selected duty cycle of the battery 10 includes a selected charging rate and time and a selected discharging rate and time, the membrane 60 is provided with sufficient hydrogen venting capacity so that excessive hydrogen pressures are not developed in the battery at any point in the selected duty cycle or at any point in a continuous sequence of duty cycles. Further, during the charging cycle of the battery, the hydrogen pressure is retained at a sufficiently low level so that there is no tendency for the battery to vent hydrogen gas through the cover aperture 38, the cover vent structure being adapted to serve only as a safety venting means in case internal battery pressure should build up due to battery misuse such as inadvertent heating of the battery.

It should be understood that although a specific battery construction has been described by way of illustration, this invention includes all modifications and equivalents thereof which fall within the scope of the appended claims.

I claim:

1. A sealed battery which is negative limited during charging comprising a casing, a membrane permeable to hydrogen gas sealing said casing, a negative electrode embodying electrochemically active zinc material, a positive electrode embodying electrochemically active nickel material, an alkaline electrolyte, and terminal means for said respective electrodes accessible at the exterior of said casing, said electrodes being disposed in spaced relation within said casing with said electrolyte forming an electrolytic path between said electrodes, said positive electrode having sufficiently greater capacity available to be charged within said casing than said negative electrode to permit substantially complete charging of said negative electrode without substantial evolution of oxygen at said positive electrode.

2. A battery as set forth in claim 1 having rigid foraminous means supporting said membrane.

3. A battery as set forth in claim 1 wherein said membrane comprises a polyethylene plastic film.

4. A battery as set forth in claim 3 wherein said membrane has a thickness of aproximately .002 inch, said battery having rigid foraminous means supporting said membrane to prevent bursting thereof at pressures less than 60 pounds per square inch.

5. A battery as set forth in claim 1 wherein said positive electrode has approximately 15% greater energy capacity than said negative electrode.

6. A sealed battery having a selected duty cycle comprising a casing, a membrane permeable to hydrogen gas sealing said casing, a negative electrode embodying electrochemically active zinc material disposed in said casing, a positive electrode embodying electrochemically active nickel material disposed in said casing and spaced from said negative electrode, an alkaline electrolyte forming an electrolytic path between said electrodes, and terminal means for said electrodes accessible of the exterior of said casing, said positive electrode having sufficiently greater available charge capacity than said negative electrode to permit substantially complete charging of said negative electrode without evolution of any significant amount of oxygen of said positive electrode, said membrane permitting hydrogen evolved in said battery during said duty cycle to be substantially vented from said casing during said duty cycle.

References Cited

UNITED STATES PATENTS

| | | | |
|---|---|---|---|
| 2,693,499 | 11/1954 | Neumann | 136—177 |
| 2,832,813 | 4/1958 | Peters | 136—30 |
| 3,053,924 | 9/1962 | Strauss et al. | 136—30 |
| 3,057,942 | 10/1962 | Smith et al. | 136—28 |
| 3,089,913 | 5/1963 | Garten et al. | 136—28 |
| 3,174,878 | 3/1965 | Peters | 136—28 |
| 3,170,819 | 2/1965 | Abramson | 136—28 |
| 3,174,879 | 3/1965 | Stanimirovitch | 136—28 |

WINSTON A. DOUGLAS, Primary Examiner

C. F. LeFEVOUR, Assistant Examiner

U.S. Cl. X.R.

136—28, 30